(12) United States Patent
Son et al.

(10) Patent No.: US 10,187,623 B2
(45) Date of Patent: Jan. 22, 2019

(54) STEREO VISION SOC AND PROCESSING METHOD THEREOF

(71) Applicant: Korea Electronics Technology Institute, Seongnam-si, Gyeonggi-do (KR)

(72) Inventors: Haeng Seon Son, Seongnam-si (KR); Seon Young Lee, Seoul (KR); Kyung Won Min, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 330 days.

(21) Appl. No.: 14/952,218

(22) Filed: Nov. 25, 2015

(65) Prior Publication Data
US 2016/0191889 A1 Jun. 30, 2016

(30) Foreign Application Priority Data

Dec. 26, 2014 (KR) .................. 10-2014-0190289
Dec. 26, 2014 (KR) .................. 10-2014-0190293

(51) Int. Cl.
| | |
|---|---|
| G06K 9/00 | (2006.01) |
| H04N 13/128 | (2018.01) |
| H04N 5/357 | (2011.01) |
| H04N 13/00 | (2018.01) |

(52) U.S. Cl.
CPC ......... *H04N 13/128* (2018.05); *H04N 5/3572* (2013.01); *H04N 2013/0081* (2013.01)

(58) Field of Classification Search
None
See application file for complete search history.

(56) References Cited

U.S. PATENT DOCUMENTS

| | | | | |
|---|---|---|---|---|
| 7,103,211 | B1 * | 9/2006 | Medioni | G06T 17/10 382/118 |
| 8,571,303 | B2 * | 10/2013 | Koizumi | G06T 7/593 345/419 |
| 9,424,461 | B1 * | 8/2016 | Yuan | G06K 9/00201 |
| 9,438,889 | B2 * | 9/2016 | Atanassov | H04N 13/246 |
| 2003/0197779 | A1 * | 10/2003 | Zhang | H04N 7/144 348/14.16 |
| 2003/0218672 | A1 * | 11/2003 | Zhang | H04N 7/144 348/14.16 |
| 2005/0219552 | A1 * | 10/2005 | Ackerman | A61B 1/042 356/603 |
| 2006/0028489 | A1 * | 2/2006 | Uyttendaele | G06T 15/205 345/646 |
| 2006/0215903 | A1 * | 9/2006 | Nishiyama | G06K 9/32 382/154 |
| 2008/0246759 | A1 * | 10/2008 | Summers | G06F 3/0304 345/420 |
| 2009/0185173 | A1 * | 7/2009 | Ashdown | G01J 1/02 356/121 |

(Continued)

*Primary Examiner* — Iman K Kholdebarin
(74) *Attorney, Agent, or Firm* — Sughrue Mion, PLLC

(57) ABSTRACT

A stereo vision SoC and a processing method thereof are provided. The stereo vision SoC extracts first support points from an image and adds second support points, performs triangulation based on the first support points and the second support points; and extracts disparity using a result of the triangulation. Accordingly, depth image quality is improved and HW is easily implemented in the stereo vision SoC.

2 Claims, 16 Drawing Sheets
(3 of 16 Drawing Sheet(s) Filed in Color)

(56) References Cited

U.S. PATENT DOCUMENTS

| | | | | |
|---|---|---|---|---|
| 2010/0277571 A1* | 11/2010 | Xu | ............... | G06T 17/00 348/47 |
| 2012/0026293 A1* | 2/2012 | Gruetzmann | ........ | G01B 11/275 348/46 |
| 2012/0177284 A1* | 7/2012 | Wang | ............... | G06T 15/205 382/154 |
| 2012/0236133 A1* | 9/2012 | Gallagher | ............... | H04N 13/15 348/60 |
| 2014/0049612 A1* | 2/2014 | Ishii | ............... | G01B 11/00 348/46 |
| 2014/0132715 A1* | 5/2014 | Raghoebardayal | ..... | G06T 17/00 348/43 |
| 2014/0184749 A1* | 7/2014 | Hilliges | ............... | G01S 17/89 348/47 |
| 2014/0198182 A1* | 7/2014 | Ward | ............... | H04N 19/597 348/43 |
| 2014/0324249 A1* | 10/2014 | Lacaze | ............... | G05D 1/0038 701/2 |
| 2015/0010230 A1* | 1/2015 | Zhou | ............... | G06K 9/00536 382/154 |
| 2015/0049169 A1* | 2/2015 | Krig | ............... | H04N 13/211 348/46 |
| 2015/0063680 A1* | 3/2015 | Liu | ............... | H04N 13/128 382/154 |
| 2015/0195510 A1* | 7/2015 | Chen | ............... | H04N 13/122 348/43 |
| 2015/0319419 A1* | 11/2015 | Akin | ............... | G06T 1/20 348/49 |
| 2015/0339805 A1* | 11/2015 | Ohba | ............... | G06F 3/011 345/156 |
| 2016/0171684 A1* | 6/2016 | De Haan | ............... | G06T 7/0012 382/103 |
| 2016/0196643 A1* | 7/2016 | Bendall | ............... | G06T 7/62 382/108 |
| 2017/0148199 A1* | 5/2017 | Holzer | ............... | G06T 11/60 |
| 2017/0171456 A1* | 6/2017 | Wei | ............... | H04N 13/246 |
| 2017/0277197 A1* | 9/2017 | Liao | ............... | G05D 1/0253 |

* cited by examiner

STEREO VISION SOC AND PROCESSING METHOD THEREOF

CROSS-REFERENCE TO RELATED APPLICATION(S) AND CLAIM OF PRIORITY

The present application claims the benefit under 35 U.S.C. § 119(a) to a Korean patent application filed in the Korean Intellectual Property Office on Dec. 26, 2014, and assigned Serial No. 10-2014-0190293, and a Korean patent application filed on Dec. 26, 2014, and assigned Serial No. 10-2014-0190289, the entire disclosure of which is hereby incorporated by reference.

TECHNICAL FIELD OF THE INVENTION

The present invention relates to a System On Chip (SoC) and a processing method thereof, and more particularly, to a stereo vision processing system which is implemented by a SoC, and a processing method thereof.

BACKGROUND OF THE INVENTION

Stereo vision is an image processing technique which acquires distance information by extracting disparity of a corresponding object from images inputted through two cameras in the same way as a person feels a sense of depth through person's two eyes. The stereo vision is mainly used in systems which recognize an object through images and estimate a distance.

In a related-art method, such a stereo vision algorithm may be normally implemented in the form of software (SW) on a PC or in the form of embedded SW using a mobile CPU such as ARM.

However, there is a limit to implementing in the form of SW to achieve miniaturization and high-speed processing, which are requirements of various applications. Therefore, there is a demand for a stereo vision processing system which is implemented in the form of SoC and thus achieves miniaturization and high-speed processing, and a processing method thereof.

Calibration and rectification of an image inputted through a camera are absolutely necessary for achieving high performance of image processing and machine vision.

Regarding an image inputted through a single camera, distortion caused by a lens is compensated for by changing the location of image data (pixels) using a compensation parameter which is obtained through the calibration process.

In addition, when stereo cameras are used, horizontality between the two cameras should be exactly adjusted to output depth, which is an output of stereo matching, on the highest level. Even if a sophisticated machine is used to mount the cameras, a tolerance is inevitably caused. Therefore, the horizontality between the two cameras may be adjusted using the above-mentioned distortion compensation method.

In the camera distortion compensation process, a location transformation matrix of image data for distortion compensation is calculated, and distortion compensation is performed by applying the transformation matrix to the image obtained by the camera.

Since an exact calculation result is more important than real-time processing, the transformation matrix is calculated and parameters which are the core of the transformation matrix are extracted based on a PC which has high calculation abilities. However, the process of compensating for distortion on the image inputted by the camera should output the result in real time for the sake of subsequent image processing and machine vision operations. To achieve this, distortion compensation calculation is processed in hardware such as a high-performance GPU, FPGA, ASIC, etc.

According to related-art distortion compensation methods, pixel location coordinates for distortion compensation are calculated and data is retrieved from a corresponding location of an image based on the pixel location coordinates and processed. Therefore, the related-art methods have long latency until the inputted image is outputted.

In addition, since it is difficult to know when image distortion compensation calculation should be performed for an image inputted by a camera, the size of a space to store image data inevitably increases.

SUMMARY OF THE INVENTION

To address the above-discussed deficiencies of the prior art, it is a primary aspect of the present invention to provide a stereo vision system which is implemented in the form of a SoC to be used in various fields such as personal portable smart devices such as wearable devices, or automobiles, and thus can achieve miniaturization and high-speed processing.

Another aspect of the present invention is to provide a method and apparatus for compensating for image distortion, which can guarantee low latency from a camera image input stage to a distortion compensation image output stage in compensating for distortion of an image inputted by a camera in real time.

Another aspect of the present invention is to provide a method and apparatus for compensating for image distortion, which can minimize a size of a buffer to store images and thus operate an image distortion compensation circuit very efficiently.

According to one aspect of the present invention, a stereo vision SoC includes: a first extraction unit configured to extract first support points from an image and add second support points; a processor configured to perform triangulation based on the first support points extracted by the first extraction unit and the second support points added by the first extraction unit; and a second extraction unit configured to extract disparity using a result of the triangulation in the processor.

The first extraction unit may be configured to add the second support points to locations where the first support points are not extracted.

The first extraction unit may be configured to add the second support points to a first line and a last line of the image.

The first extraction unit may be configured to add the second support points to corner points of the image and some points between the corner points.

The first extraction unit may be configured to extract the first support points with reference to peaks of a cost function regarding a feature vector of the image.

The first extraction unit may be configured to extract points at which a first peak/second peak is less than a reference value as the first support points.

The second extraction unit may be configured to convert a 3×3 plane equation regarding a triangle obtained from the result of the triangulation into a 2×2 plane equation, and determine a plane equation.

According to another aspect of the present invention, a stereo vision processing method includes: a first extraction step of extracting first support points from an image and adding second support points; a step of performing triangulation based on the first support points extracted in the first extraction step and the second support points added in the first extraction step; and a second extraction step of extracting disparity using a result of the triangulation.

According to another aspect of the present invention, a method for compensating for image distortion includes: a first calculation step of calculating coordinates for distortion compensation with respect to a current line to be compensated; a second calculation step of calculating a location of a maximum line which is required to compensate for distortion of the current line; and a step of, when images up to the maximum line are stored, compensating for the image distortion of the current line.

The second calculation step may include a step of calculating a location of a line which is obtained by adding a specific value to a greatest coordinate y' in coordinates (x', y') calculated in the first calculation step.

The coordinate y' may have a value of a decimal fraction, and the specific value may be 1.

The second calculation step may include a step of, when barrel distortion occurs, detecting the greatest coordinate y' from side coordinates (x', y') on an upper portion and from center coordinates (x', y') on a lower portion; and a step of, when pincushion distortion occurs, detecting the greatest coordinate y' from the center coordinates (x', y') on the upper portion and from the side coordinates (x', y') on the lower portion.

The step of compensating for the image distortion may include a step of compensating for the distortion on a basis of a line of the image using a compensation parameter acquired in an image calibration process.

According to another aspect of the present invention, an apparatus for compensating for image distortion includes: a first calculation unit configured to calculate coordinates for distortion compensation with respect to a current line to be compensated; a second calculation unit configured to calculate a location of a maximum line which is required to compensate for distortion of the current line; and a third calculation unit configured to, when images up to the maximum line are stored, compensate for the image distortion of the current line.

According to exemplary embodiments of the present invention described above, a stereo vision system is implemented in the form of a SoC and thus can be miniaturized and enabled to perform high-speed processing, so that the stereo vision system can be used in various fields such as personal portable smart devices such as wearable devices, or automobiles.

In addition, according to exemplary embodiments of the present invention, optimal support points can be extracted based on $1^{st}/2^{nd}$ peaks of a cost function, and the support points are forcedly added so that depth image quality can be improved and HW can be easily implemented.

In addition, according to exemplary embodiments of the present invention, in compensating for a distorted image in real time, output latency of a distortion compensation image can be minimized.

In addition, according to exemplary embodiments of the present invention, the size of a buffer to store image data necessary for distortion compensation can be reduced, and a location for distortion compensation can be predicted in advance, so that a circuit operation can be implemented efficiently.

BRIEF DESCRIPTION OF THE DRAWINGS

The patent or application file contains at least one drawing executed in color. Copies of this patent or patent application publication with color drawing(s) will be provided by the Office upon request and payment of the necessary fee. For a more complete understanding of the present disclosure and its advantages, reference is now made to the following description taken in conjunction with the accompanying drawings, in which like reference numerals represent like parts:

FIG. 14 is a view showing an image (left) which is distorted and an image (right) distortion of which is compensated for;

Throughout the drawings, like reference numerals will be understood to refer to like parts, components and structures.

DETAILED DESCRIPTION OF THE INVENTION

Figure 1:
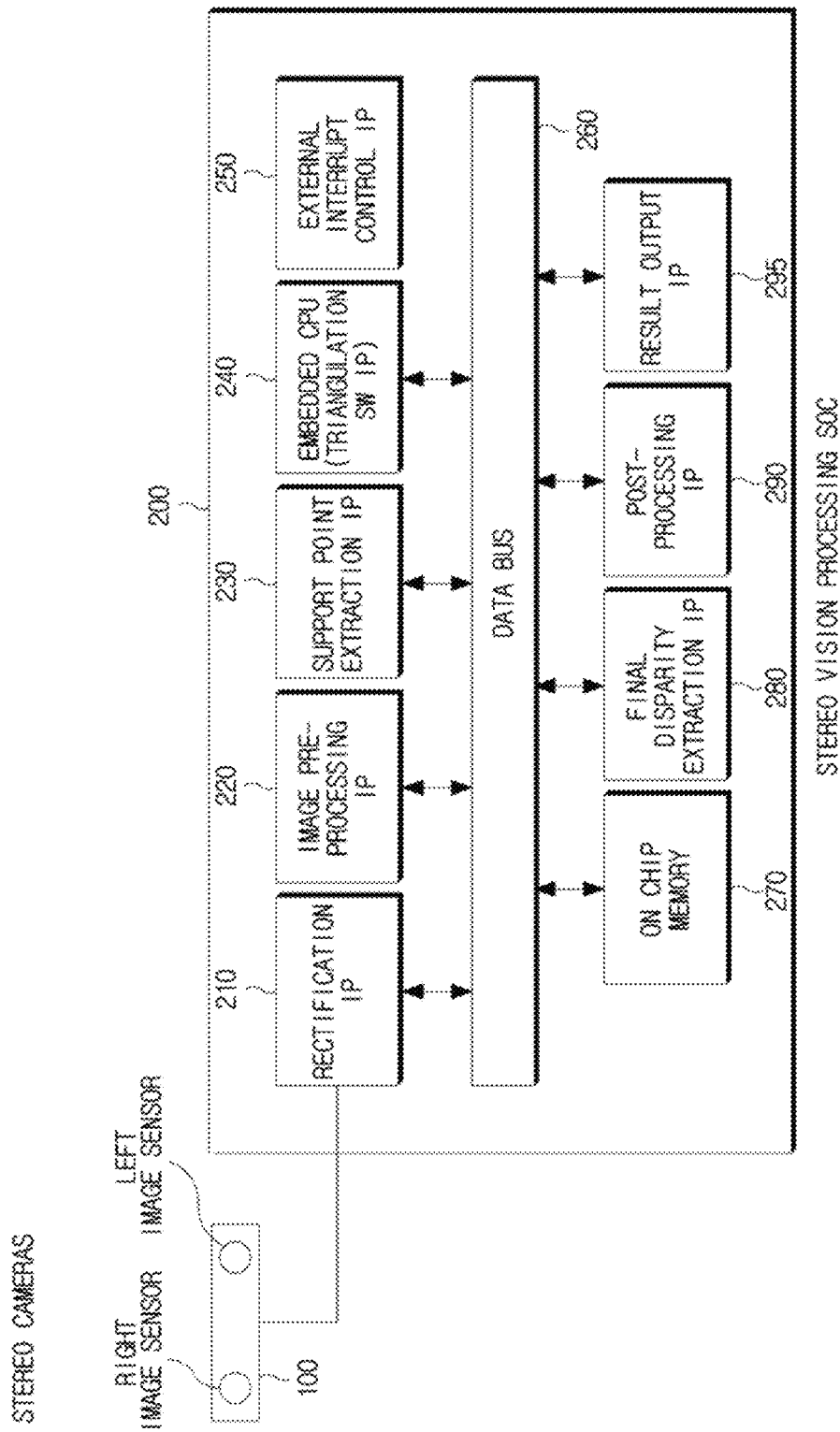
FIG. 1 is a view showing a configuration of a stereo vision SoC.

Reference will now be made in detail to the embodiment of the present general inventive concept, examples of which are illustrated in the accompanying drawings, wherein like reference numerals refer to the like elements throughout. The embodiment is described below in order to explain the present general inventive concept by referring to the drawings.

Hereinafter, the present invention will be explained in detail with reference to the accompanying drawings.

Stereo vision cameras, which calculate distance information using two cameras in the same way as a human being feels a sense of depth of an object and views objects in three dimensions using binocular disparity, are increasingly used in various fields such as automobiles, robots, wearable devices, etc.

In two or more cameras which are mounted with a baseline distance therebetween, the same object may appear in the images with disparity. Such binocular disparity may be extracted, and a distance value (Z) from the cameras to the object may be directly calculated by Equation 1 presented below:

$$Z = \frac{f \cdot T}{d} \quad \text{Equation 1}$$

where f is a focal distance of a pixel unit, T is a distance between two cameras, and d is disparity.

In a stereo vision system, an algorithm for finding a matching point in the left and right images is normally performed to extract disparity. This algorithm may be implemented in various ways. The most popular way is implanting the algorithm in the form of SW on a PC. As an embedded type is increasingly demanded, the algorithm may normally be implemented in the form of embedded SW on a mobile CPU or a DSP.

However, as portability and real-time processing are highlighted and miniaturization and high-speed processing are required, the algorithm is required to be implemented in the form of a semiconductor chip rather than in the form of SW.

According to an exemplary embodiment of the present invention, such a stereo vision system is implemented in the form of a SoC which is a processor-embedded semiconductor chip, and the inner structure of the SoC to achieve this and an efficient processing method thereof are suggested.

FIG. 1 is a view showing a configuration of a stereo vision SoC. As shown in FIG. 1, the stereo vision SoC 200 has functional modules which exist therein and are called "Intellectual Properties (IPs)." The IPs include a hardware (HW) IP which is a semiconductor circuit, and an SW IP which is executed on an embedded CPU. All of the IPs 210, 220, 230, 240, 250, 280, 290, and 295 are connected to a data bus 260, and an on chip memory 270 is connected to the data bus 260, so that mutual data transmission is possible.

Figure 2A:
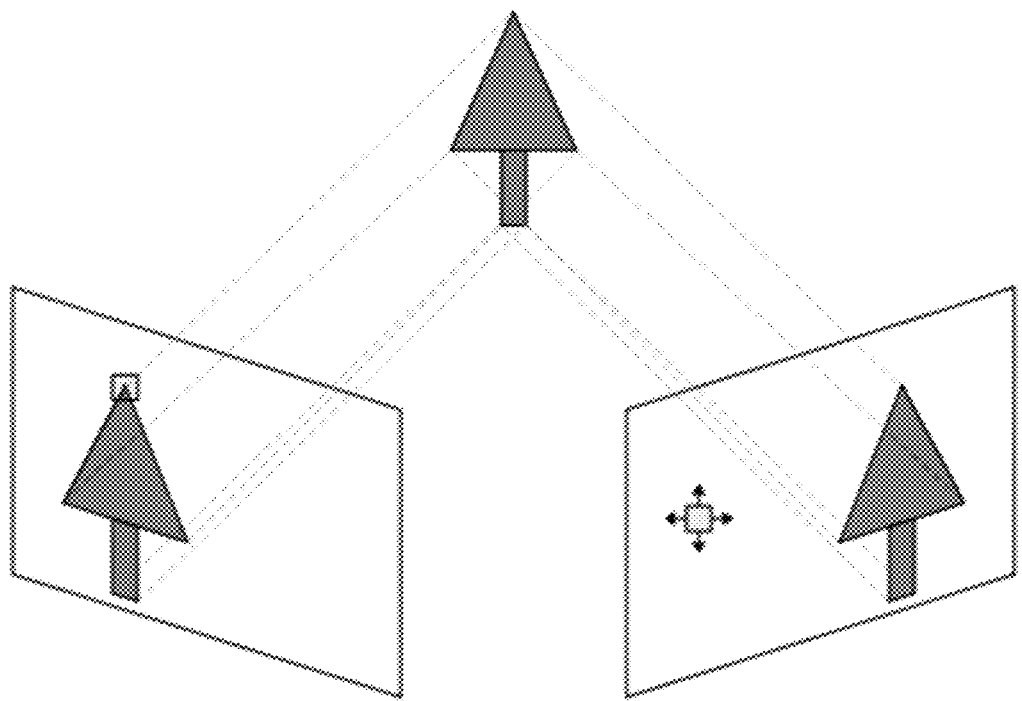
FIGS. 2A and 2B is a view showing a result of performance of a rectification IP.
Figure 2B:
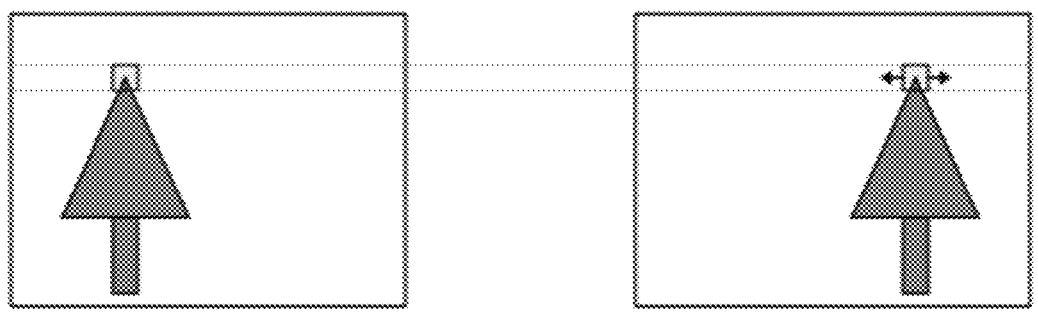

The rectification IP 210 performs row alignments with respect to images which are obtained by left and right cameras 100, and converts the images such that matching points of pixels exist on the same horizontal line in the left and right images. In this case, since the matching points can be found not in the entire images but in the corresponding horizontal line, calculation can be simplified. FIGS. 2a and 2b illustrate the result of the performance of the rectification IP.

Since the images entering from the two different left and right cameras 100 have different histogram distribution characteristics, the image pre-processing IP 220 performs equalization to make the histogram distribution characteristic equal to each other, or removes noise.

The support point extraction IP 230 is an IP which defines a point that has relatively high matching accuracy in the left and right images as a support point, and extracts this point. When the support point is extracted, a cost function of two feature vectors is defined using feature vectors using contrast, color, edge information, etc. of the image, and disparity having a minimum cost function value is searched.

Figure 3:
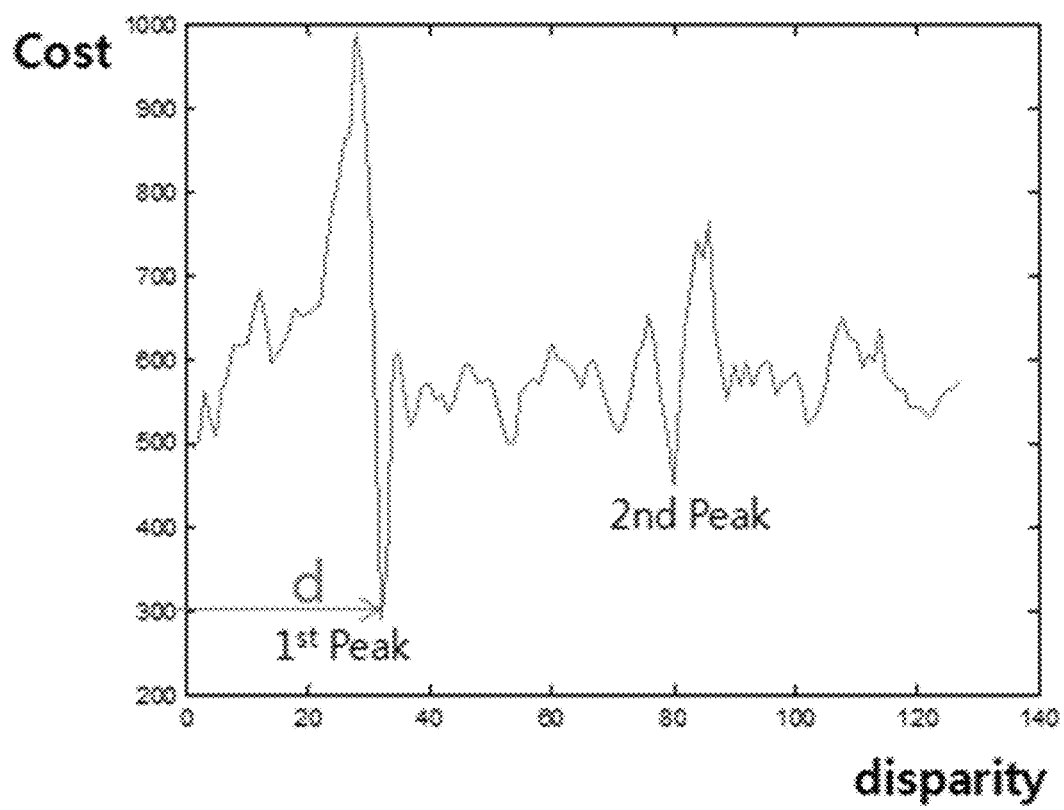
FIG. 3 is a view showing a definition of a support point.

A feature vector in (u, v) coordinates of the left image is defined as FL (u, v), a feature vector in (u-d, v) coordinates of the right image is defined as FR (u-d, v), and a cost function of FL (u, v) and FR (u-d, v) is defined as Cost (FL (u, v), FR (u-d, v)). Herein, d is disparity. When the value of the cost function is obtained by increasing d from 0 to dmax, a graph shown in FIG. 3 may be obtained, and a condition suggested in Equation 2 presented below should be satisfied to make the (u, v) coordinates into a support point. The (u, v) coordinates satisfying the following condition is specified as a support point, and in this case, a disparity value is d. Therefore, the support point in this case is (u, v, d).

$$\frac{1st \text{ Peak}}{2nd \text{ Peak}} < \text{constant value}(\text{constant value} < 1) \quad \text{Equation 2}$$

Figure 4:
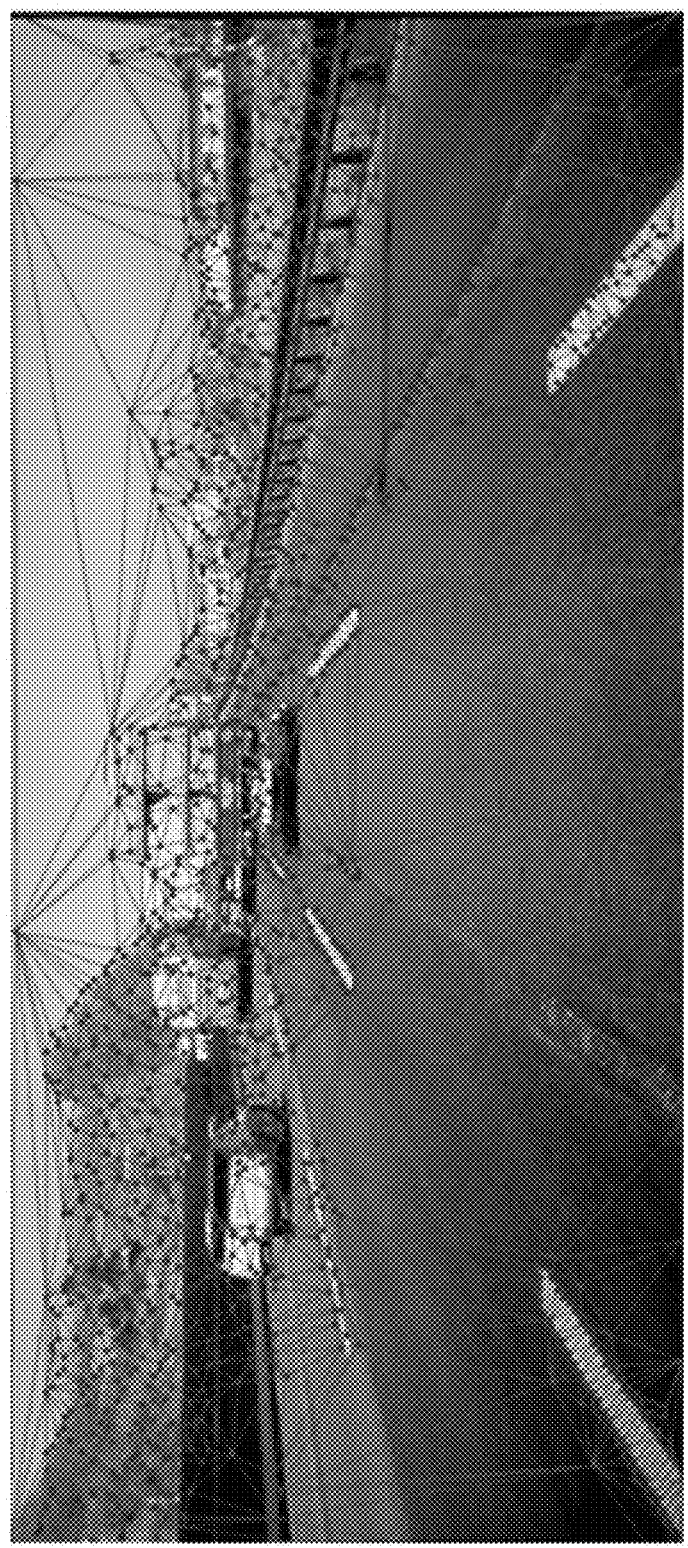
FIG. 4 is a view showing a result of extracting and triangulating support points.

The triangulation SW IP 240 is an IP which performs triangulation with respect to points extracted as support points, and is implemented in the form of SW rather than in the form of an HW logic and thus is processed on an embedded CPU in the SoC. The triangulation SW IP 240 receives a plurality of support points (u, v, d) and performs Delaunay triangulation as shown in FIG. 4, and obtains an equation regarding a three-dimensional trigonal plane which is formed of three support points s1 (u1, v1, d1), s2 (u2, v2, d2), and s3 (u3, v3, d3) forming a triangle.

When the equation of the plane is d (disparity)=au+bv+c, a, b, and c may be calculated according to Equation 3 presented below. However, considering that an algorithm for obtaining a 3×3 3-dimensional inverse matrix is complicated and takes much time, Equation 4 presented below is suggested in an exemplary embodiment of the present invention. Since a 2×2 inverse matrix rather than a 3×3 inverse matrix is required according to Equation 4, time required to calculate can be reduced.

$$\begin{bmatrix} a \\ b \\ c \end{bmatrix} = \begin{bmatrix} u_1 & v_1 & 1 \\ u_2 & v_2 & 1 \\ u_3 & v_3 & 1 \end{bmatrix}^{-1} \begin{bmatrix} d_1 \\ d_2 \\ d_3 \end{bmatrix} \quad \text{Equation 3}$$

$$\begin{bmatrix} a \\ b \end{bmatrix} = \begin{bmatrix} u_1 - u_1 & v_1 - v_2 \\ u_2 - u_3 & v_2 - v_3 \end{bmatrix}^{-1} \begin{bmatrix} d_1 - d_2 \\ d_2 - d_3 \end{bmatrix} \quad \text{Equation 4}$$

$$c = d_1 - au_1 - bv_1 - c$$

Hereinafter, a method for forcedly adding a support point for the sake of depth easy image quality improvement and HW implementation will be explained in detail.

Since the support point is a point at which matching accuracy is relatively high, the support points are mainly distributed where characteristics strongly appear like edges. Therefore, the support point is less likely to be extracted from a place where there is little texture information like the sky or a road. When the stereo cameras 100 are used to recognize an object ahead of a car, it is important to exactly extract disparity information of the road. This is because disparity distribution of the road is used to separate the obstacle existing ahead, and the road from each other.

In addition, if triangles are not distributed over the entire image and exist only in some area when the HW IP is implemented, an area for extracting disparity is not exactly fixed and is variable according to the result of the triangulation. This variability makes it difficult to implement HW.

Therefore, according to an exemplary embodiment of the present invention, a support point is forcedly added to the first line and the last line of the image, so that image quality of depth can be easily improved and the HW IP can be easily implemented.

The support points are forcedly added to four corner points of the image, (0, 0), (width-1, 0), (height-1, 0), (width-1, height-1), and are forcedly added at specific intervals between the points.

Figure 5:
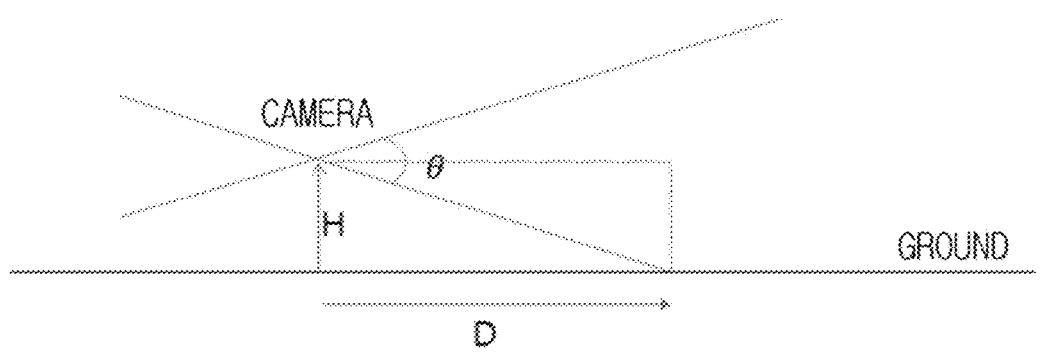
FIG. 5 is a view showing a method for calculating disparity of a support point which is inserted into the last line of an image.

The disparity value of the support point which is inserted into the first line of the image is 0, and the disparity value of the support point which is inserted into the last line may be calculated by Equation 5 presented below. Herein, f is a focal distance of a pixel unit of a camera, T is a distance between two stereo cameras, 0 is a vertical angle of view of the camera, H is a mounting height of the camera, and D is a distance to a place where the ground appears in the camera for the first time (see FIG. 5).

$$\text{Bottom\_Disparity} = fT/D, D = H/\tan(0.5\ theta) \quad \text{Equation 5}$$

Figure 6:
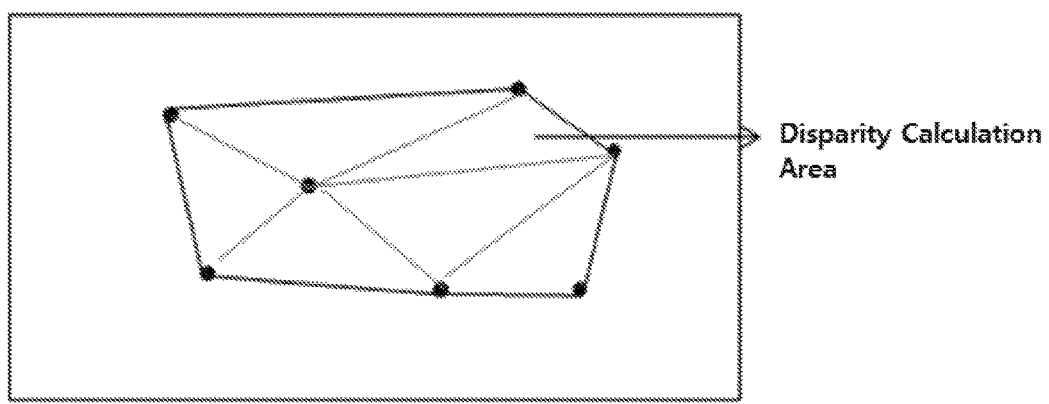
FIG. 6 is a view showing a disparity calculation area when a support point is not added, in which the disparity calculation area varies according to the size of the area and the location of support points forming the edge of the area.
Figure 7:
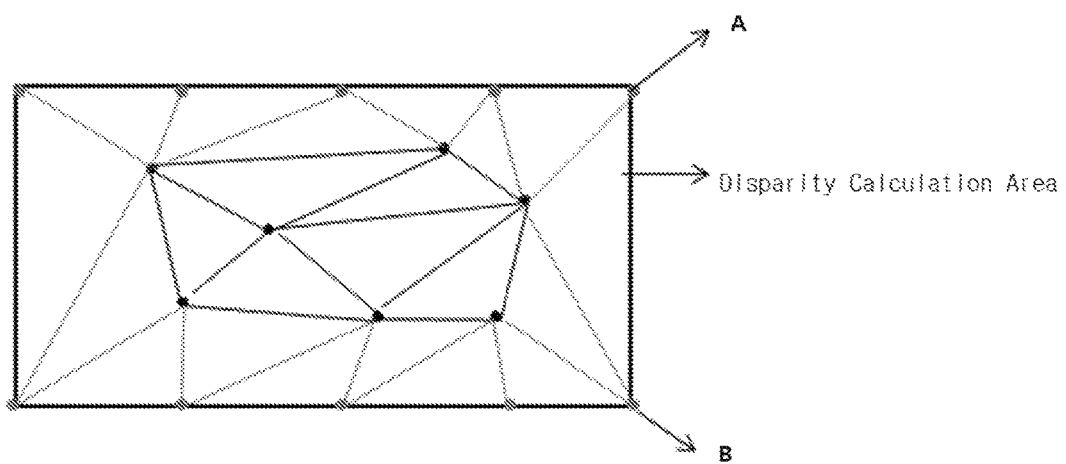
FIG. 7 is a view showing a disparity calculation area when a support point is added, in which the disparity calculation area is fixed for the entire image. Point "A" shows the case when support points are added to the upper end of the image and disparity=0: the support points are necessarily inserted into corner points and are inserted at specific intervals between the corner points. Point "B" shows the case when support points are added to the lower end of the image, and disparity=Bottom_Disparity: the support points are necessarily inserted into corner points and are inserted at specific intervals between the corner points.
Figure 8:
FIG. 8 is a view showing a result of triangulation when a support point is not added.
Figure 9:
FIG. 9 is a view showing a result of triangulation when a support point is added.

FIG. 6 illustrates a disparity calculation area when a support point is not added, and FIG. 7 illustrates a disparity calculation area when a support point is added. FIG. 8 illustrates a result of triangulation when a support point is not added, and FIG. 9 illustrates a result of triangulation when a support point is added.

It can be seen from FIGS. 6 to 9 that the disparity calculation area increases by adding the support point, and optimally, depth can be calculated in a larger area.

The support point may be forcedly added to other locations than the upper end or lower end of the image, and a gap between the support points may be adaptively determined. However, it is preferable to limit a point to which the support point is forcedly added to a point from which an exact disparity value can be known.

The present invention will be explained referring back to FIG. 1.

Figure 10:
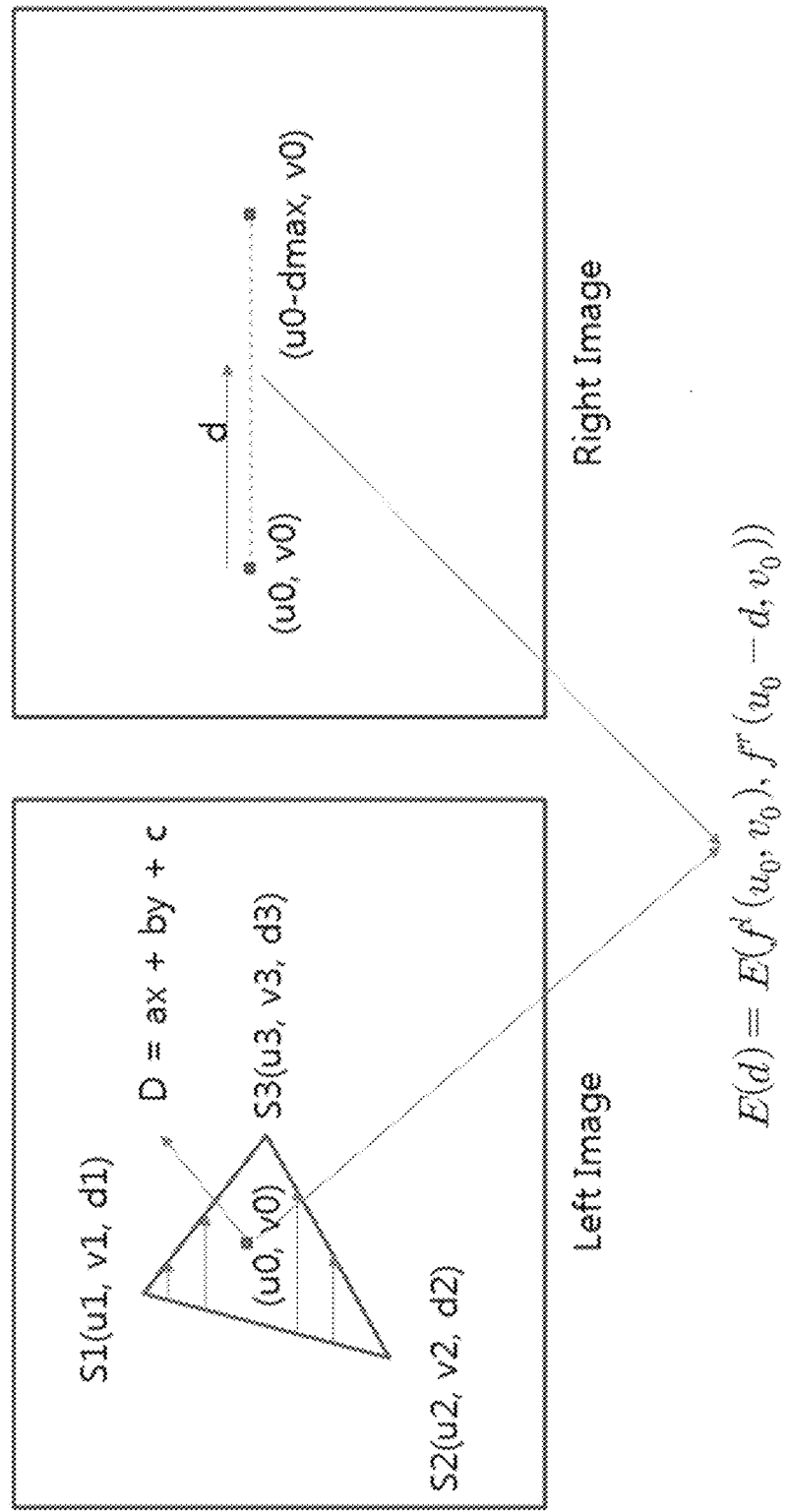
FIG. 10 is a view showing a final disparity determination process.

The final disparity extraction IP 280 is an IP which receives the result of the addition of the support points which are extracted by the triangulation SW IP 240, and the result of the triangulation, and extracts final disparity. The final disparity extraction IP 280 determines disparity having minimum energy with respect to points inside the triangle while scanning the triangles one by one. Respective energy values are calculated from one point (u0, v0) of the left image to points (u0, v0)-(u0-dmax, v0) of the right image, and then disparity having a minimum energy value is determined as final disparity at (u0, v0) (see FIG. 10).

Herein, when d approximates to a disparity estimation value which is calculated by the plane equation, $\mu=D(u0,v0)$, d is calculated by applying a corresponding weight.

1) if $|d - \mu| < 3\sigma$(constant value)

$$E(d) = \beta \|f^{(l)} - f^{(r)}(d)\|_1 - \log\left[\gamma + \exp\left(-\frac{(d-\mu)^2}{2\sigma^2}\right)\right]$$

2) otherwise, $$E(d) = \beta \|f^{(l)} - f^{(r)}(d)\|_1$$

The post-processing IP 290 performs post-processing to improve quality of the final disparity which is extracted by the final disparity extraction IP 280 through cross check, interpolation, noise filtering, etc.

The final output IP 295 is an IP which generates a control signal and a data signal to output the image and disparity data to the outside.

All of the HW IPs provided in the stereo vision SoC 200 are connected to the external interrupt control IP 250. The embedded CPU 240 transmits a processing start command to the HW IPs to operate the HW IPs, and the HW IPs receive the start command and perform their respective roles. Then, when the operations are finished, the HW IPs generate interrupt signals for the external interrupt control IP 250. The external interrupt control IP 250 generates an external interrupt signal and informs the embedded CPU 240 that the corresponding processing is finished.

Figure 11:
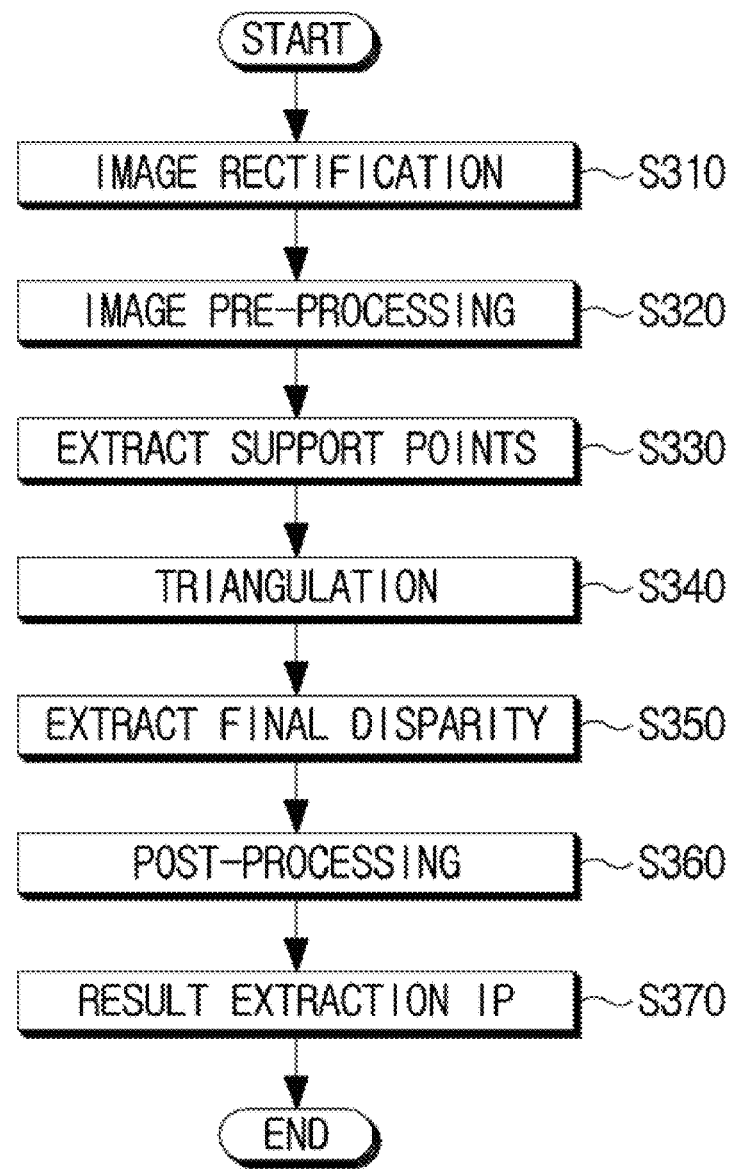
FIG. 11 is a flowchart showing a stereo processing order.
Figure 12:
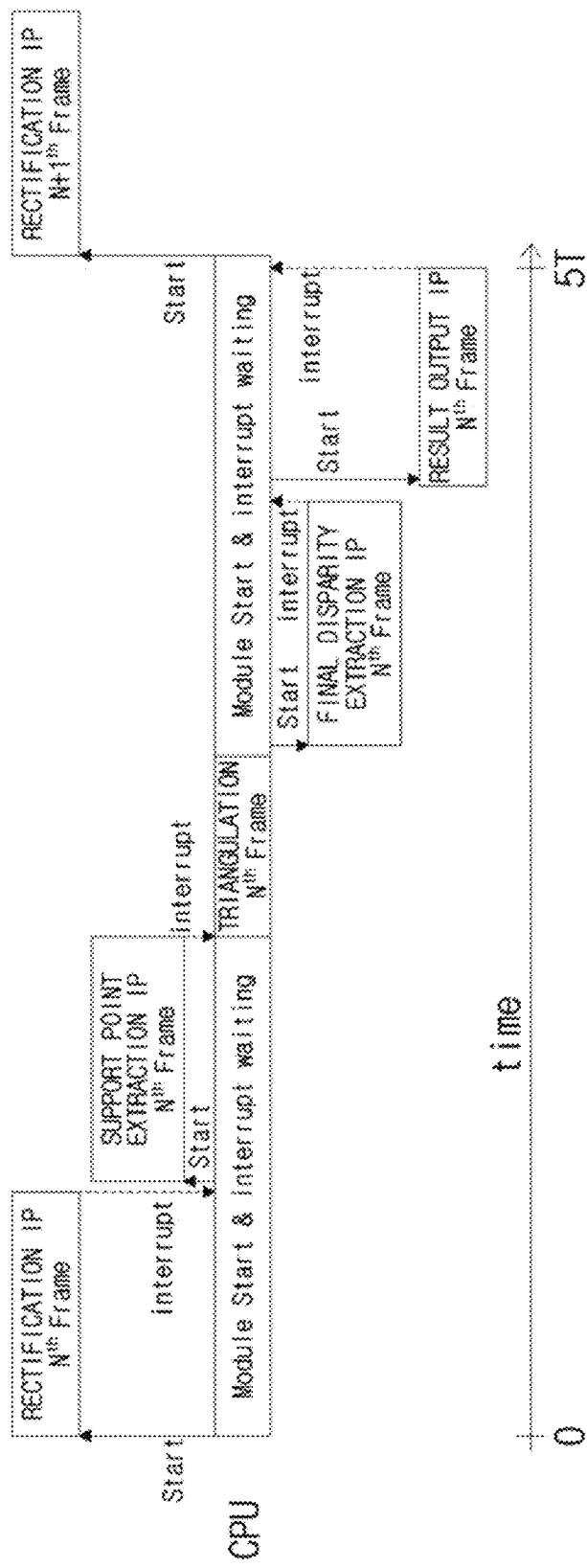
FIG. 12 is a flowchart showing an operation of a stereo SoC with time.

FIG. 11 is a flowchart showing a stereo vision processing order, and FIG. 12 is a flowchart showing the operation of the stereo vision SoC 200 with time. The embedded CPU 240 operates each of the HW IPs, and, upon receiving the external interrupt signal indicating the end of each of the operations, operates the next HW IP module. However, since the triangulation is performed by the SW IP, the triangulation is processed in the embedded CPU 240.

Figure 13:
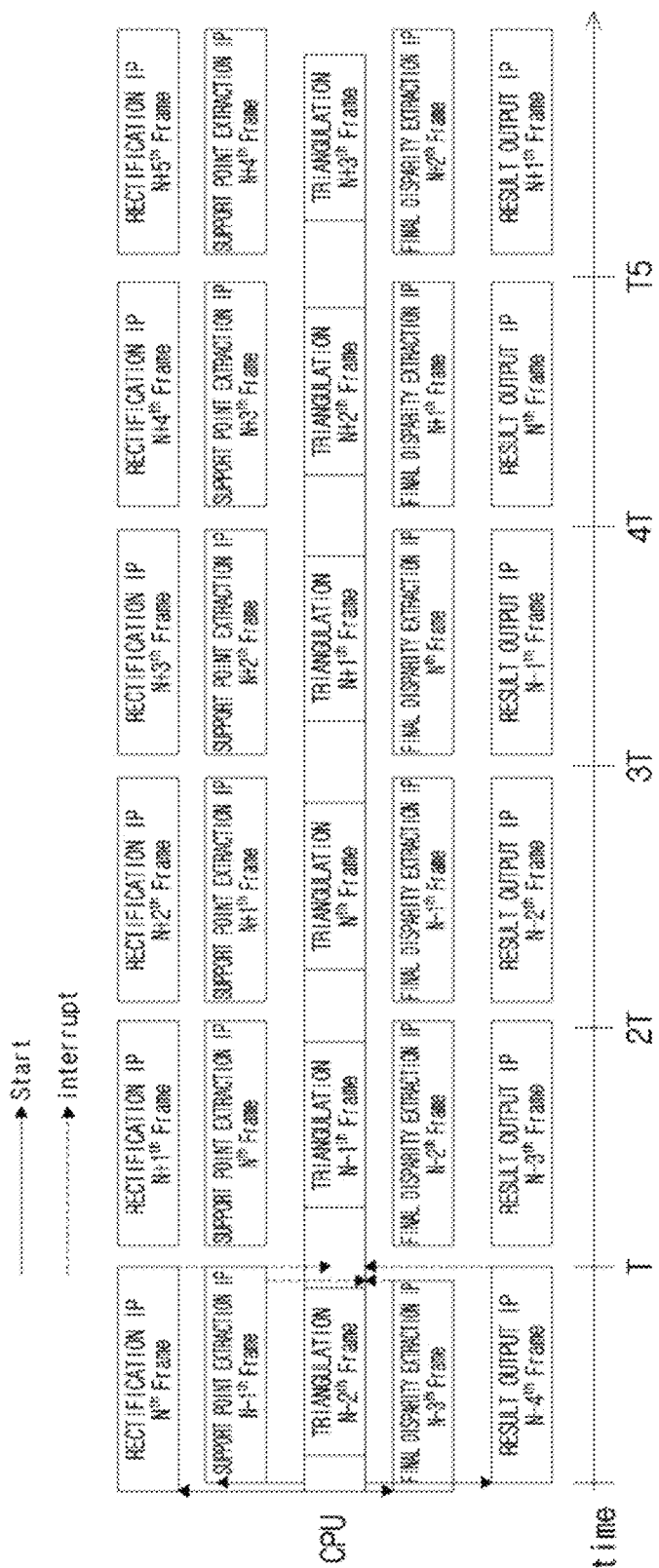
FIG. 13 is a flowchart showing a stereo SoC high-speed pipeline operation with time.

When the IPs are operated as shown in FIG. 12, most of the operations of the embedded CPU 240 require much time to wait for the interrupt signals, and accordingly, a processing speed is reduced. However, when the modules are implemented by pipelining as shown in FIG. 13, the processing ability per a second is improved and thus the processing is performed five times faster than in FIG. 12. Herein, the embedded CPU 240 transmits the start signal to the respective HW IP modules simultaneously and processes the triangulation SW until the interrupt signal is generated, and then checks whether interrupt signals are generated from the HW IPs and processes the next frame. It is possible to use all of the HW resources and CPU performance simultaneously, and thus stereo vision processing can be performed at high speed.

According to another exemplary embodiment of the present invention, a method for compensating for distortion of an image which is inputted by a camera used in an image processing and machine vision system in real time, and having minimum latency to output a compensated image and a minimum image storage space.

Figure 14:
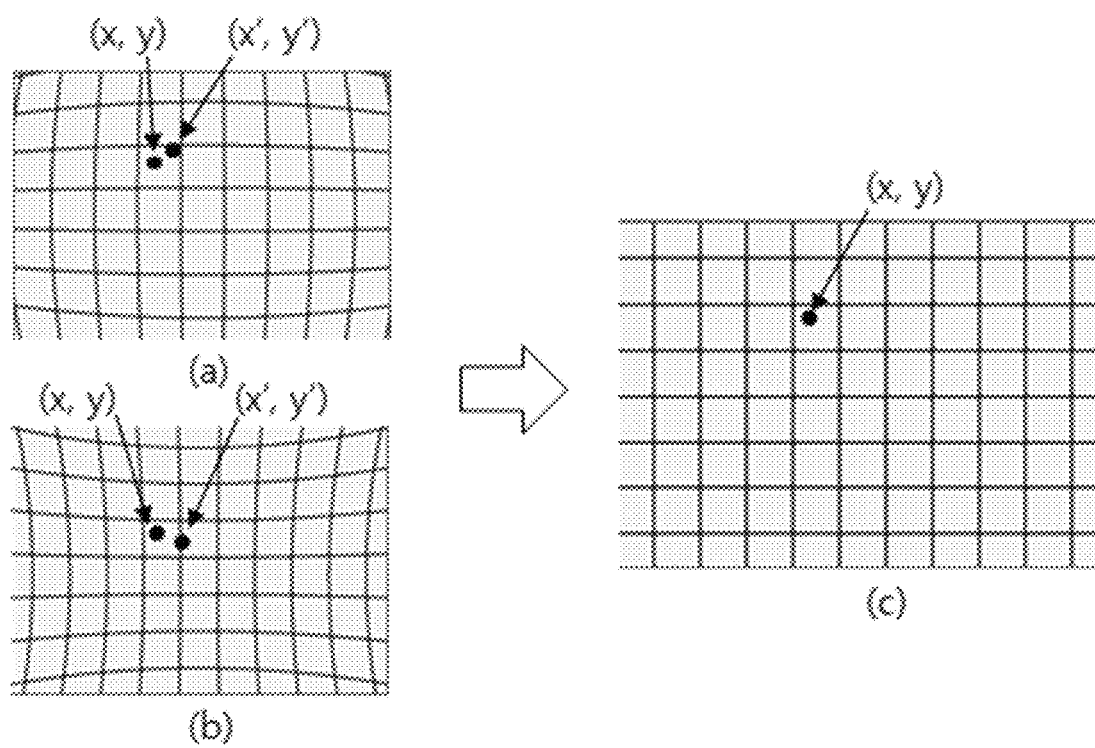

FIG. 14 is a view to illustrate a concept of image distortion compensation to be implemented according to an exemplary embodiment of the present invention. FIG. 14 illustrates distorted images which are obtained by cameras (left view) and a resulting image when distortion is compensated for (right view).

View (a) of FIG. 14 illustrates barrel distortion and view (b) illustrates pincushion distortion. In FIG. 14, (x, y) indicates coordinates of an image which is inputted by the camera and is expressed by integers, and (x', y') indicates coordinates which are used as an input to an image distortion compensation device for compensating for distortion, and is expressed by decimal fractions.

Figure 15:
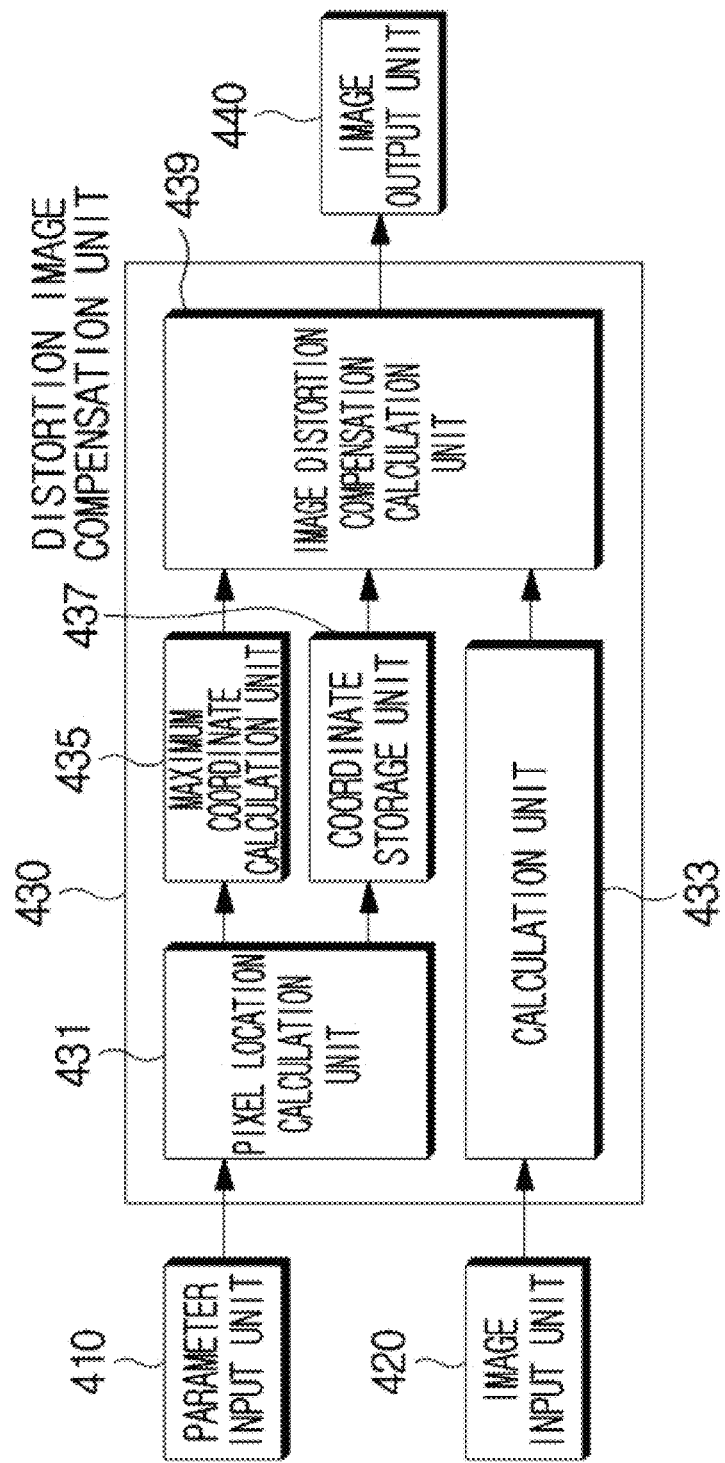
FIG. 15 is a block diagram showing an image distortion compensation apparatus according to an exemplary embodiment of the present invention.

FIG. 15 is a block diagram of an image distortion compensation device according to an exemplary embodiment of the present invention. The image distortion compensation device according to an exemplary embodiment of the present invention includes a parameter input unit 410, an image input unit 420, a distortion image compensation unit 430, and an image output unit 440.

The parameter input unit 410 provides various parameter values for distortion image compensation, which are obtained in the calibration process.

The image input unit 420 includes a camera interface which is necessary for receiving an image from a camera (not shown), and converts a camera input image in various formats such as MIPI, ITU-T 601, etc. into image data in the form of YUV or RGB, and transmits the image data to the distortion image compensation unit 430.

The distortion image compensation unit 430 includes a pixel location calculation unit 431, an image storage unit 433, a maximum coordinate calculation unit 435, a coordinate storage unit 437, and an image distortion compensation calculation unit 439.

The pixel location calculation unit 431 calculates coordinates for distortion compensation, the coordinate storage unit 437 stores the coordinates which are calculated by the pixel location calculation unit 431, and the maximum coordinate calculation unit 435 stores the greatest value y" from among the coordinate values stored in the coordinate storage unit 437.

The image storage unit 433 stores the camera input image transmitted through the image input unit 420.

The image distortion compensation calculation unit 439 compensates for the distorted image, and the image output unit 440 outputs the image the distortion of which is compensated for in the image distortion compensation calculation unit 439 to the outside.

Figure 16:
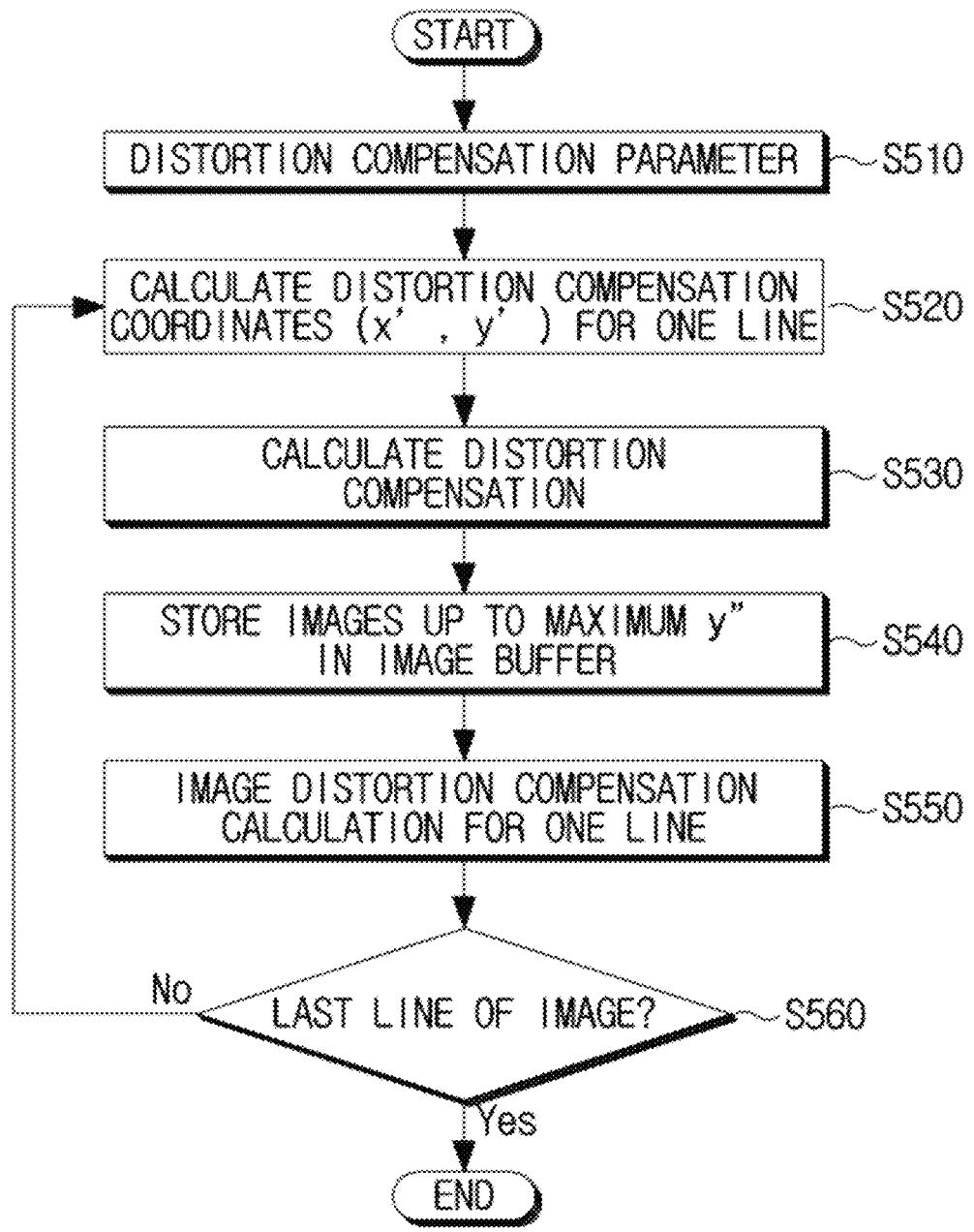
FIG. 16 is a flowchart to illustrate an image distortion compensation method according to another exemplary embodiment of the present invention.

Hereinafter, a process of compensating for a distorted image by the image distortion compensation calculation unit 439 will be explained in detail with reference to FIG. 16. FIG. 16 is a flowchart to illustrate a method for compensating for image distortion according to an exemplary embodiment of the present invention.

As shown in FIG. 16, the parameter input unit 410 receives a distortion compensation parameter which is obtained through a calibration process (S510). The image distortion compensation is performed on a basis of a line of an image using the distortion compensation parameter which is inputted in step S510.

Next, the pixel location calculation unit 431 calculates coordinates (x', y') for distortion compensation with respect to a current line y to be compensated using the distortion compensation parameter inputted in step S510 (S520). The coordinates (x', y') calculated in step S520 are stored in the coordinate storage unit 437.

In step S520, y' is expressed by a decimal fraction to obtain an exactly compensated pixel value. However, since the image is inputted in the form of y coordinate expressed by an integer, image data up to the line y'+1 is required to perform distortion compensation calculation.

The maximum coordinate calculation unit 435 detects a maximum coordinate y" (=y'+1) from the result of the calculation in step S520 (S530). The maximum coordinate y" indicates the location of a maximum line in the y-axis direction which is required to compensate for distortion with respect to the current line y.

The coordinate y' detected in step S530 is the greatest coordinate y' from among coordinates (x', y') calculated in step S520.

Referring to view (a) of FIG. 14, when barrel distortion occurs, the greatest coordinate y' is detected from the side coordinates (x', y') on the upper portion and from the center coordinates (x', y') on the lower portion.

In addition, referring to view (b) of FIG. 14, when pincushion distortion occurs, the greatest coordinate y' is detected from the center coordinates (x', y') on the upper portion and from the side coordinates (x', y') on the lower portion.

When the image on the maximum line y" is stored in the image storage unit 433 (S540), the distortion compensation calculation unit 439 performs image distortion compensation calculation with respect to the current line y (S550). Since the coordinates for image distortion compensation are expressed by decimal fractions, interpolation compensation may be performed to exactly express the coordinates.

Thereafter, when the current line y which has undergone the distortion compensation calculation is the last line (S560-Y), the distortion compensation calculation is finished.

On the other hand, when the current line y which has undergone the distortion compensation calculation is not the last line (S560-N), step S520 is resumed to perform the distortion compensation calculation with respect to the next line (y+1).

The method and apparatus for compensating for image distortion efficiently have been described up to now.

According to the above-described exemplary embodiments, when the distortion of the image inputted by the camera is compensated for, the maximum value y" in the y-axis direction required to compensate for distortion of the current line is determined. Therefore, the time required to store the entirety or part of the image in an inner buffer can be optimized, and thus the latency from an image input stage to an output stage can be minimized.

In addition, since the size of a storage space necessary for performing distortion compensation calculation with respect to the image inputted from the outside can be optimized according to y", the size of the buffer can be minimized.

In addition, in the above-described exemplary embodiments, the maximum line y" is equal to y'+1, but this is merely an optimal example, and a different maximum line y" may be applied. For example, the technical idea of the present invention can be applied to an exemplary embodiment in which the maximum line y" is equal to y'+a (a is a natural number greater than or equal to 2).

In addition, the image distortion compensation according to exemplary embodiments of the present invention can be applied to a single camera in addition to the stereo cameras. Furthermore, the image distortion compensation according to exemplary embodiments of the present invention can be applied to a multi-view system in which three or more cameras are combined with one another.

In addition, there is no limit to the kind of camera and the kind of image to which the present invention is applicable, and the technical idea of the present invention can be applied when the cameras and the images are appropriately implemented according necessity and specifications.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A stereo vision system-on-chip (SoC) comprising:
    a first extraction circuit configured to extract first support points from an image and add second support points to the image;
    a processor configured to perform triangulation based on the first support points extracted by the first extraction circuit and the second support points added by the first extraction circuit; and
    a second extraction circuit configured to extract disparity using a result of the triangulation in the processor, convert a 3×3 plane equation regarding a triangle obtained from the result of the triangulation into a 2×2 plane equation, and determine a plane equation of the image as the 2×2 plane equation.

2. A stereo vision system-on-chip (SoC) comprising:

a rectification circuit configured to perform row alignment on images captured by a plurality of cameras that are located at different positions, and convert the images to have matching points of pixels exist on a same horizontal line in the images;

a first extraction circuit configured to extract first support points from the images and add second support points to the images;

a processor configured to perform triangulation based on the first support points extracted by the first extraction circuit and the second support points added by the first extraction circuit; and a second extraction circuit configured to extract disparity using a result of the triangulation in the processor, wherein the processor is further configured to transmit a start signal to the rectification circuit, the first extraction circuit, and the second extraction circuit simultaneously and perform the triangulation until an interruption signal is received from any one of the rectification circuit, the first extraction circuit, and the second extraction circuit, so that the row alignment, the extraction of the first support points and the addition of the second support points, the triangulation, and the extraction of the disparity are performed in parallel.

* * * * *